(No Model.) 2 Sheets—Sheet 1.

J. M. CROUT.
SEED PLANTER AND FERTILIZER DISTRIBUTER.

No. 460,818. Patented Oct. 6, 1891.

Witnesses
M. B. Harris
J. C. Wilson

Inventor
Jefferson M. Crout
by
Whitman & Wilkinson
Attorneys

THE NORRIS PETERS CO., PHOTO-LITHO., WASHINGTON, D. C.

(No Model.) 2 Sheets—Sheet 2.

J. M. CROUT.
SEED PLANTER AND FERTILIZER DISTRIBUTER.

No. 460,818. Patented Oct. 6, 1891.

Witnesses
M. B. Harris
J. C. Wilson

Inventor
Jefferson M. Crout
by
Whitman + Wilkinson
Attorneys

UNITED STATES PATENT OFFICE.

JEFFERSON M. CROUT, OF LEESVILLE, SOUTH CAROLINA.

SEED-PLANTER AND FERTILIZER-DISTRIBUTER.

SPECIFICATION forming part of Letters Patent No. 460,818, dated October 6, 1891.

Application filed June 2, 1891. Serial No. 394,822. (No model.)

*To all whom it may concern:*

Be it known that I, JEFFERSON M. CROUT, a citizen of the United States, residing at Leesville, in the county of Lexington and State of South Carolina, have invented certain new and useful Improvements in Seed-Planters and Fertilizer-Distributers; and I do hereby declare the following to be a full, clear, and exact description of the invention, such as will enable others skilled in the art to which it appertains to make and use the same.

My invention relates to combined seed-planters and fertilizer-distributers; and it consists of certain novel features herein described and claimed.

Reference is had to the accompanying drawings, wherein the same parts are indicated by the same letters.

Figure 1:
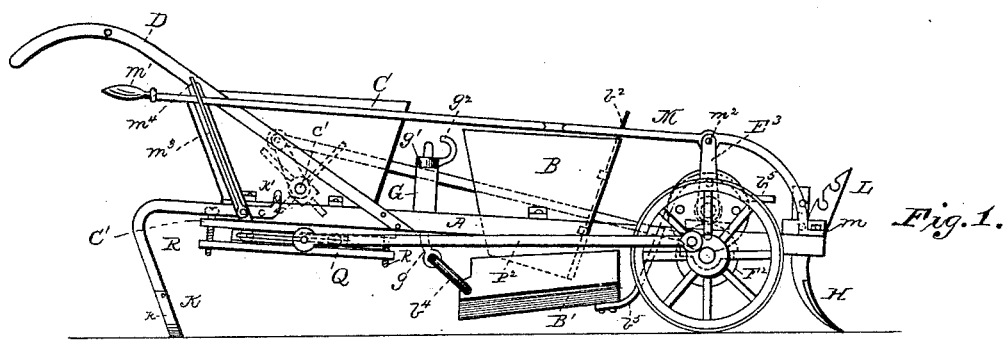
Figure 2:
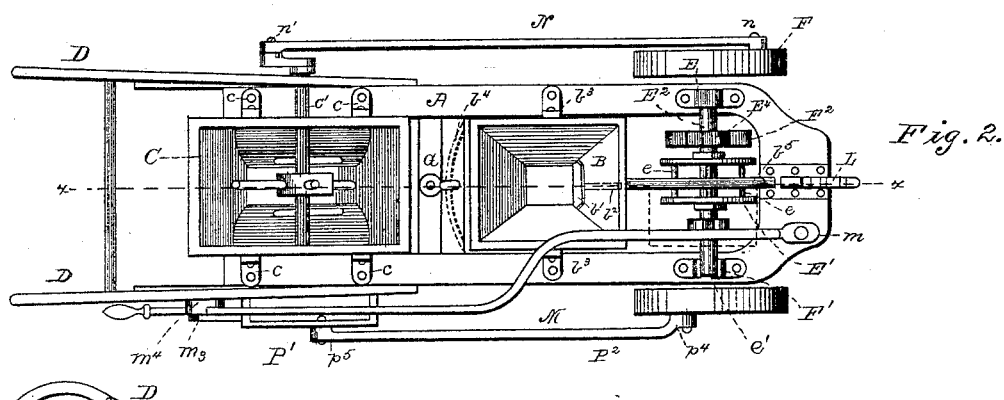
Figure 3:
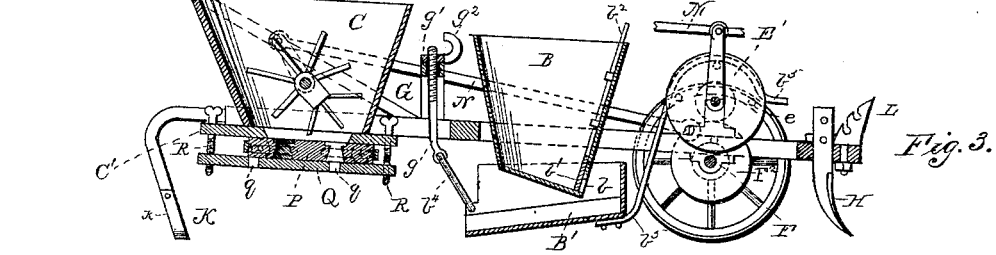
Figure 4:
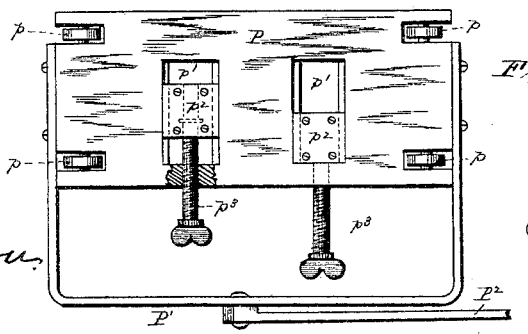
Figure 5:
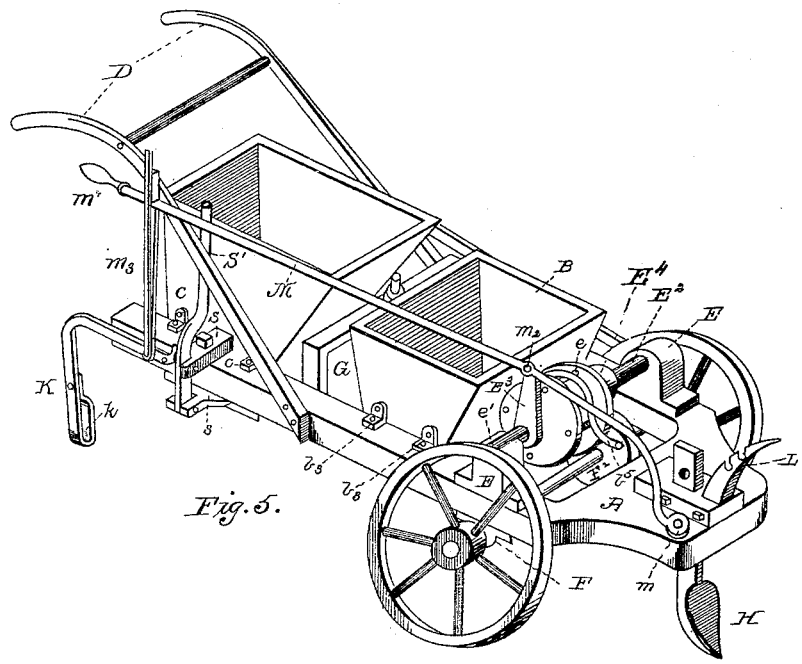
Figure 6:
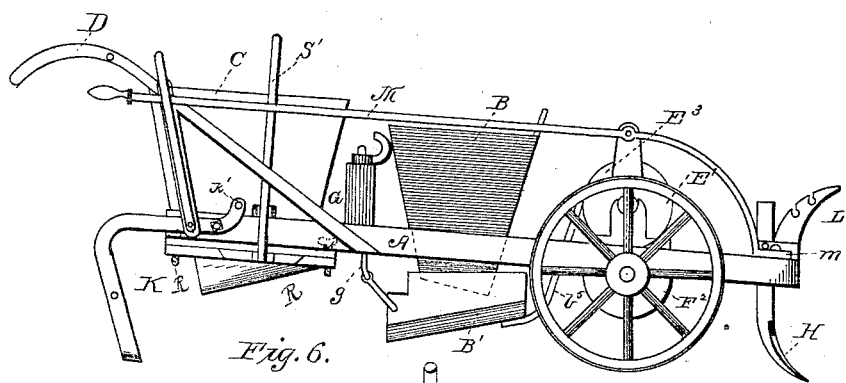
Figure 7:
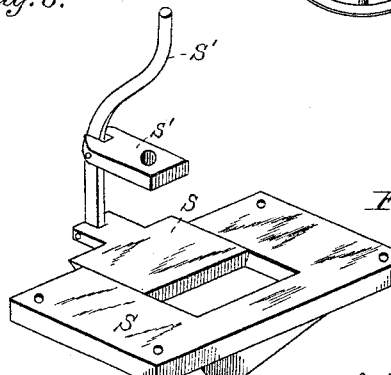

Figure 1 represents a side elevation of the machine. Fig. 2 represents a plan view thereof. Fig. 3 represents a longitudinal sectional elevation. Fig. 4 represents a plan view of the reciprocating slide. Fig. 5 represents a a perspective view of the machine, showing a modified form of seed-dropping device as adapted for drilling seed. Fig. 6 represents a side elevation of the device shown in Fig. 5. Fig. 7 represents a perspective view of the adjustable bottom to the seed-hopper shown in Figs. 5 and 6.

A represents the frame to which the fertilizer-hopper B, seed-hopper C, handles D, journals E, cross-piece G, furrow-opener H, coverers K, draft-posts L, and bar M are attached.

The fertilizer-hopper B has an inclined floor with an opening $b$ at the lower end of the said incline, and a slide $b'$ and rod $b^2$ for closing the said opening, as in going from field to field, or for regulating the discharge therethrough. The said hopper B is removably mounted in the frame-work A, and is held in place by the angle-irons $b^3$, bolted to the frame-work and to the hopper. By unscrewing the bolts in said angle-irons the fertilizer-hopper may be readily removed from the machine, which may then be used as a seed-planter only. Beneath the opening in the fertilizer-hopper the vibrating trough or "shaker" B is placed. This trough slopes to the rear and is supported at the rear end by the bent bar $b^4$, which engages in the eyebolt $g$, passing through the cross-piece G. On the upper end of this bolt the nut $g'$, having a thumb-lug $g^2$ integral therewith, is screwed on. By screwing this nut up and down the slope of the trough B' and its rate of delivery are varied. The upper end of this trough is closed and is supported by a curved bar $b^5$, which passes over a number of parallel rods $e$, set between two disks E', mounted on the shaft $E^2$, rotating in the journals E. One of said journals incloses the said shaft entirely, while the other is open, as at $e'$.

$E^3$ is an arm loosely inclosing the shaft $E^2$ and connected at $m^2$ to the friction-bar M, which is detachably connected at its front end $m$ to the frame-work A and at its rear end has a handle $m'$.

$m^3$ is a straight spring of wood or metal, and $m^4$ is a block for holding the friction-bar down or up, as may be desired. On the shaft $E^2$ is a friction-wheel $E^4$, adapted to engage a friction-wheel $F^2$ on the axle F, when the friction-bar M is held down beneath the block $m^4$ and to be clear of the said friction-wheel when the friction-bar rests on top of the block $m^4$.

The operation of the machine as a fertilizer-distributer is as follows: The hopper B being charged with fertilizer, the slide $b'$ is adjusted by means of the rod $b^2$, the slope of the trough B' is adjusted also by means of the nut $g'$, and the friction-bar M is thrown under the block $m^4$, as shown in Fig. 1, making the friction-wheel $E^4$ press on the friction-wheel $F^2$, and as the wheels F and F' revolve by means of the friction-disks $F^2$ and $E^4$ the disks E' and rods $e$ are caused to revolve. These rods give a vibratory motion to the bent bar $b^5$, which shakes the trough B' and causes the fertilizer to settle down toward its lower end and fall into the furrow opened by the plow H. The plows K cover up the fertilizer.

It will be seen that the machine will operate independently as a fertilizer-distributer with the attachments for planting seed either disconnected or entirely removed, provision for which detachment or removal has been made, as will be hereinafter described. It will also be evident that by taking out the hopper B, taking off the nut $g'$, removing the trough B' and the shaft E, with the various disks secured thereon, and detaching the bar M from the frame-work A at $m$ the entire fertilizer-distributing apparatus may be removed and the machine used as a seed-planter alone.

The planter mechanism consists of the seed-hopper C, mounted on the false bottom C', permanently attached to the frame-work A, and the various parts which co-operate in dropping seed from said hopper. The hopper C is detachably connected to said frame-work by means of the angle-irons c. Running transversely across the hopper is the shaft c', carrying a number of prongs or stirrers. These stirrers are vibrated by the connecting-rod N, attached at one end by the crank-pin n to the wheel F and at the other end by the crank-pin n', attached to a crank on the shaft c'. The connection between the rod N and wheel F is made so as to be readily detachable. The reciprocating slide P consists of a flat piece of wood or metal mounted on four anti-friction rollers p and having two adjustable slots p' near the center of the said slide. These slots are adjusted by means of the sliding blocks $p^2$ and the thumb-screws $p^3$. A bent metal bar P' serves to protect and stiffen the ends of the reciprocating slide and to furnish a means of connecting the said slide to the connecting-rod $P^2$, which is detachably connected to the wheel F' by means of the crank-pin $p^4$. The said connecting-rod $P^2$ is connected to the bar P' by means of the pin $p^5$. The reciprocating slide travels on a bottom board or plate Q, having perforations q in the wake of the adjustable slots p' in the said slide. This bottom board or plate Q is detachably connected to the fixed bottom C' by means of the thumb-screws R.

The operation of the seed-planting mechanism is as follows: The sliding blocks $p^3$ being adjusted by means of the thumb-screws $p^3$, the connecting-rod N vibrates the stirrers, while the rod $P^2$ works the reciprocating slide, the seed being dropped into the furrow made by the plow H and being covered by the coverers K. The fertilizer may or may not be dropped in with the seed, as may be desired.

By making the seed-planting mechanism and the fertilizer-distributing mechanism independent of each other, and both detachable, the machine may with little trouble be fitted to work as a seed-planter alone or as a fertilizer-distributer alone, or as a combined seed-planter and fertilizer-distributer.

Figs. 5, 6, and 7 represent a modification of the seed-planting device, the reciprocating slide being taken off by removing the thumb-screws R and detaching the connecting-rod $P^2$ at $p^4$ and then using the same thumb-screws. The board or plate S is screwed on beneath the seed-hopper. This board or plate has an adjustable slide s, connected to the hand-lever S', fulcrumed at s'. By means of this lever the width of the slot between the board or plate S and the slide s is varied at will, and so the machine is adapted for use as a seed-drill. It will be evident that this drilling attachment may be used in combination with or independently of the fertilizer-distributing device herein described. The coverers K are bent over at k, (see Fig. 5,) and they are so bolted onto the frame-work A that they may be readily shifted from side to side. It will be evident that they would cover closer when turned in, as shown in Fig. 5, than when turned out, as would be the case were the two coverers shifted to the opposite sides. The coverers K, plow H, and draft-post L are also adjusted for light and deep planting; but this adjustment is not a part of my invention and is not claimed herein.

What I do claim, and desire to secure by Letters Patent of the United States, is—

1. In an agricultural implement, the combination, with a hopper and an inclined trough beneath the said hopper, of a frame-work mounted on two wheels, a shaft connecting those wheels, a friction-disk mounted on said shaft, a movable counter-shaft mounted in said frame-work nearly parallel with said shaft, a friction-disk on said counter-shaft adapted to engage the before-mentioned friction-disk, and a device actuated by said counter-shaft for vibrating said inclined trough, substantially as described.

2. In an agricultural implement, the combination, with the frame-work A and wheels F and F', mounted on a shaft in said frame-work, of the friction-disk $F^2$, mounted on said shaft, the counter-shaft $E^2$, friction-disk $E^4$, disks E', and rods e, all mounted on said counter-shaft, the hopper B, inclined trough B' beneath the said hopper, with means of altering the inclination thereof, and bent bar $b^5$, substantially as described.

In testimony whereof I affix my signature in presence of two witnesses.

JEFFERSON M. CROUT.

Witnesses:
J. L. MATTHEWS,
J. W. ASBILL.